(12) United States Patent
Verma et al.

(10) Patent No.: US 12,309,292 B2
(45) Date of Patent: May 20, 2025

(54) MULTI-COMPUTER SYSTEM FOR USER AUTHENTICATION BASED ON CLIENT-SIDE ONE-TIME PASSCODE

(71) Applicant: Bank of America Corporation, Charlotte, NC (US)

(72) Inventors: Sandeep Verma, Haryana (IN); Pavan Chayanam, Alamo, CA (US); Srinivas Dundigalla, Waxhaw, NC (US); Nandini Rathaur, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 242 days.

(21) Appl. No.: 17/893,665

(22) Filed: Aug. 23, 2022

(65) Prior Publication Data

US 2024/0073029 A1     Feb. 29, 2024

(51) Int. Cl.
| | |
|---|---|
| *H04L 9/32* | (2006.01) |
| *H04L 9/00* | (2022.01) |
| *H04L 9/08* | (2006.01) |

(52) U.S. Cl.
CPC .......... *H04L 9/3255* (2013.01); *H04L 9/0833* (2013.01); *H04L 9/50* (2022.05)

(58) Field of Classification Search
CPC ........ H04L 9/3255; H04L 9/50; H04L 9/0833
USPC ....................................................... 713/180
See application file for complete search history.

(56) References Cited

U.S. PATENT DOCUMENTS

| | | | |
|---|---|---|---|
| 7,571,489 B2 | 8/2009 | Ong et al. | |
| 9,858,401 B2 | 1/2018 | Fiske | |
| 9,979,719 B2 | 5/2018 | Oberheide et al. | |
| 10,091,194 B2 | 10/2018 | Votaw et al. | |
| 10,728,027 B2 | 7/2020 | Fiske | |
| 2008/0301460 A1* | 12/2008 | Miller | H04L 63/0815 713/183 |

* cited by examiner

*Primary Examiner* — Anthony D Brown
(74) *Attorney, Agent, or Firm* — Banner & Witcoff, Ltd.

(57) ABSTRACT

Arrangements for generating and using client-side generated one-time passcodes (OTP) for transaction processing are provided. A request to register a user and/or user computing device for client-side OTP processing may be received. A request to register a merchant for client-side OTP processing may also be received and, in respond, a unique access key unique to the merchant may be generated and transmitted to one or more devices. A request to process a transaction may be received and may include the unique access key, transaction details, and user device data. The request may be analyzed to determine whether one or more criteria are met. If so, client-side OTP functions may be enabled. If not, client-side OTP functions might not be enabled and, instead, a request for additional authentication data may be generated and transmitted to the user computing device for display.

21 Claims, 13 Drawing Sheets

Entity Application

400

Payment Device Number [ xxxx-xxxx-xxxx-xxxx ]

Expiration Date [ mm-yyyy ]

[ Cancel ]  [ Process ]

FIG. 4

Entity Application

500

Congratulations Name!

Your transaction was
successfully processed.

MULTI-COMPUTER SYSTEM FOR USER AUTHENTICATION BASED ON CLIENT-SIDE ONE-TIME PASSCODE

BACKGROUND

Aspects of the disclosure relate to electrical computers, systems, and devices for providing user authentication based on a generated client-side one-time passcode (OTP).

Maintaining user privacy and security of user data is important, particularly when processing transactions that might not be performed in person (e.g., online transactions, or the like). Accordingly, in some arrangements, additional authentication may be requested. For instance, a request to process a transaction may include first level authentication that may include input of a credit card number, expiration date, card verification value (CVV), and the like. In some conventional arrangements, second level authentication may be required and may include a one-time passcode (OTP). In conventional systems, the OTP may be generated by, for instance, a transaction processing entity such as a financial institution, in response to a request for a transaction. The OTP may be transmitted or sent to a registered user device, or a user device requesting the transaction, and the user may input the OTP into a transaction processing user interface (e.g., merchant application, website, or the like). The merchant may then send the received OTP to the transaction processing entity for verification. This process may be inefficient and may require user interaction and input that may slow the process. Accordingly, it would be advantageous to reduce the need for user input in transaction processing using OTP.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with using one-time passcodes for transaction processing.

In some aspects, a request to register a user and/or user computing device for client-side one-time passcode (OTP) processing may be received. The request may include user identifying data, user computing device identifying data, and the like. In some examples, the request may include permissions from the user to enable client-side OTP functionality, share user computing device data, and the like.

In some arrangements, a request to register an external entity for client-side OTP processing may be received. In some examples, the request may include identification of the external entity being registered, and the like. In response to the request, a unique access key unique to the external entity may be generated and transmitted to the external entity computing system. In some examples, the unique access key may be transmitted to the user computing device and stored via an external entity application on the user computing device.

In some examples, a request to process a transaction may be received. The request may include the unique access key of the merchant, transaction details, user device data (e.g., active or running application data), and the like. The data associated with the request may be analyzed to determine whether one or more criteria are met. If so, client-side OTP functions may be enabled and an instruction causing the user computing device to generate a client-side OTP may be generated and transmitted to the user computing device. If not, client-side OTP functions might not be enabled and, instead, a request for additional authentication data may be generated and transmitted to the user computing device for display.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4 and 5 illustrate example user interfaces that may be generated in accordance with one or more aspects described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, conventional methods of authentication for transaction processing may involve more than one level of authentication that may include use of an OTP. For instance, a user may request a transaction using a user computing device, such as a registered mobile device, and may make the request by inputting credit card details, account details, or other payment details into a merchant application or website executing on the user device. The merchant may transmit that data to a transaction processing entity, such as a financial institution, who may generate an OTP and send the OTP to the registered user computing device. The user may then input the OTP to the merchant application or website and the OTP may then be transmitted to the transaction processing entity for verification. However, this conventional process may be inefficient and may rely on user input and interaction. In addition, this may require multiple calls from the merchant to the transaction processing entity (e.g., a first call with card or payment details that may prompt generation of the OTP and a second call with the OTP data).

Accordingly, aspects described herein maintain the security of the user associated with OTP for second level authentication while reducing interaction required by the user and consolidating all data used for multiple levels of authentication into one call to the transaction processing entity. For instance, a user may initiate a transaction via a merchant application executing on a mobile device of the user. In initiating the transaction, the user may input credit card or other payment details. Data associated with the transaction, as well as a unique access key associated with the merchant, and user and/or device identifying data may be analyzed to determine whether one or more criteria are met. If so, client-side OTP functions may be enabled and the user computing device may generate a client-side OTP for use in authenticating the user and authorizing the transaction. If not, additional authentication data may be requested (e.g., an OTP generated by the transaction processing entity and input by the user, username and password, or the like).

These and various other arrangements will be discussed more fully below.

Figure 1A:
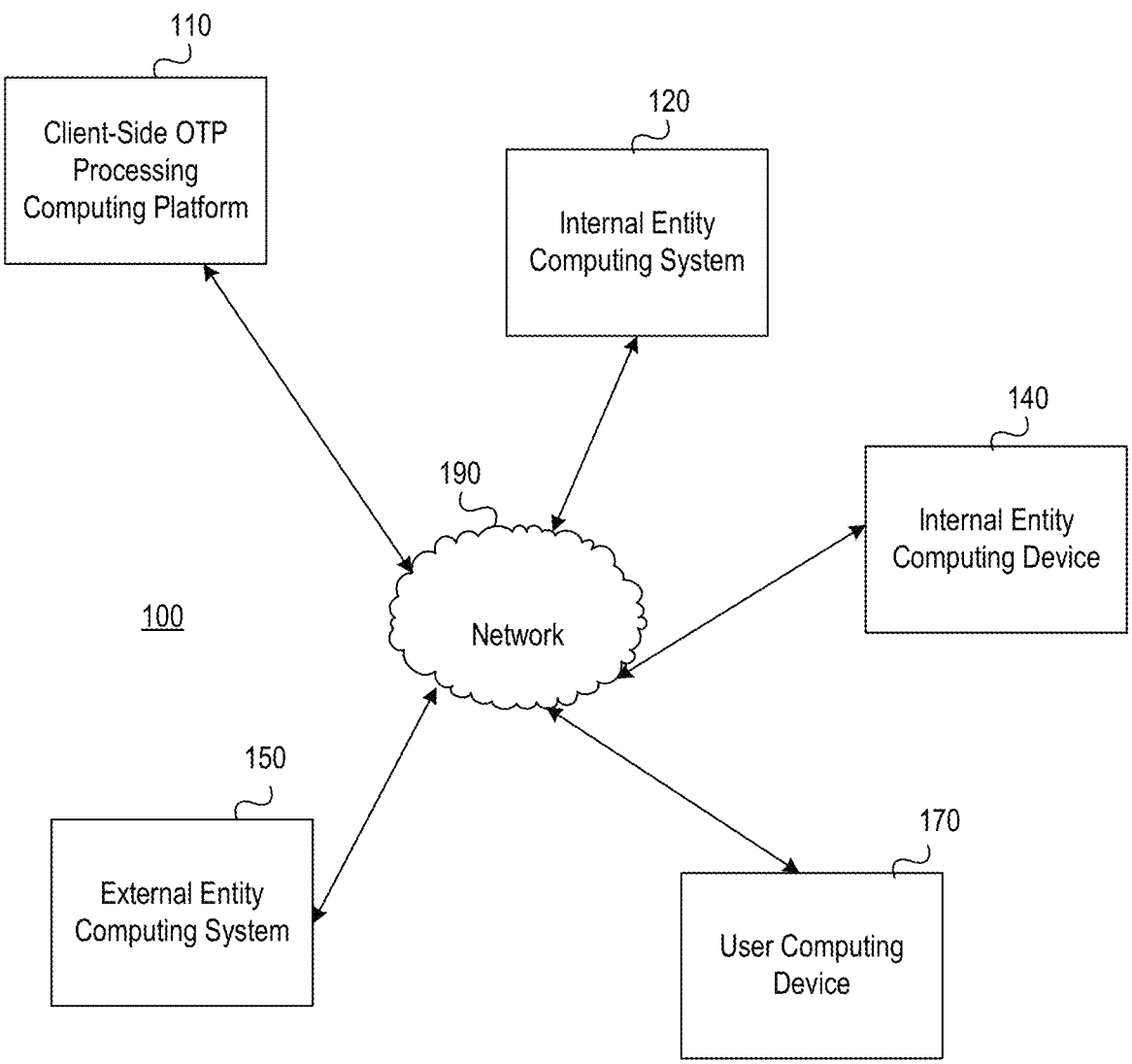
FIGS. 1A and 1B depict an illustrative computing environment for implementing client-side OTP processing functions in accordance with one or more aspects described herein.
Figure 1B:
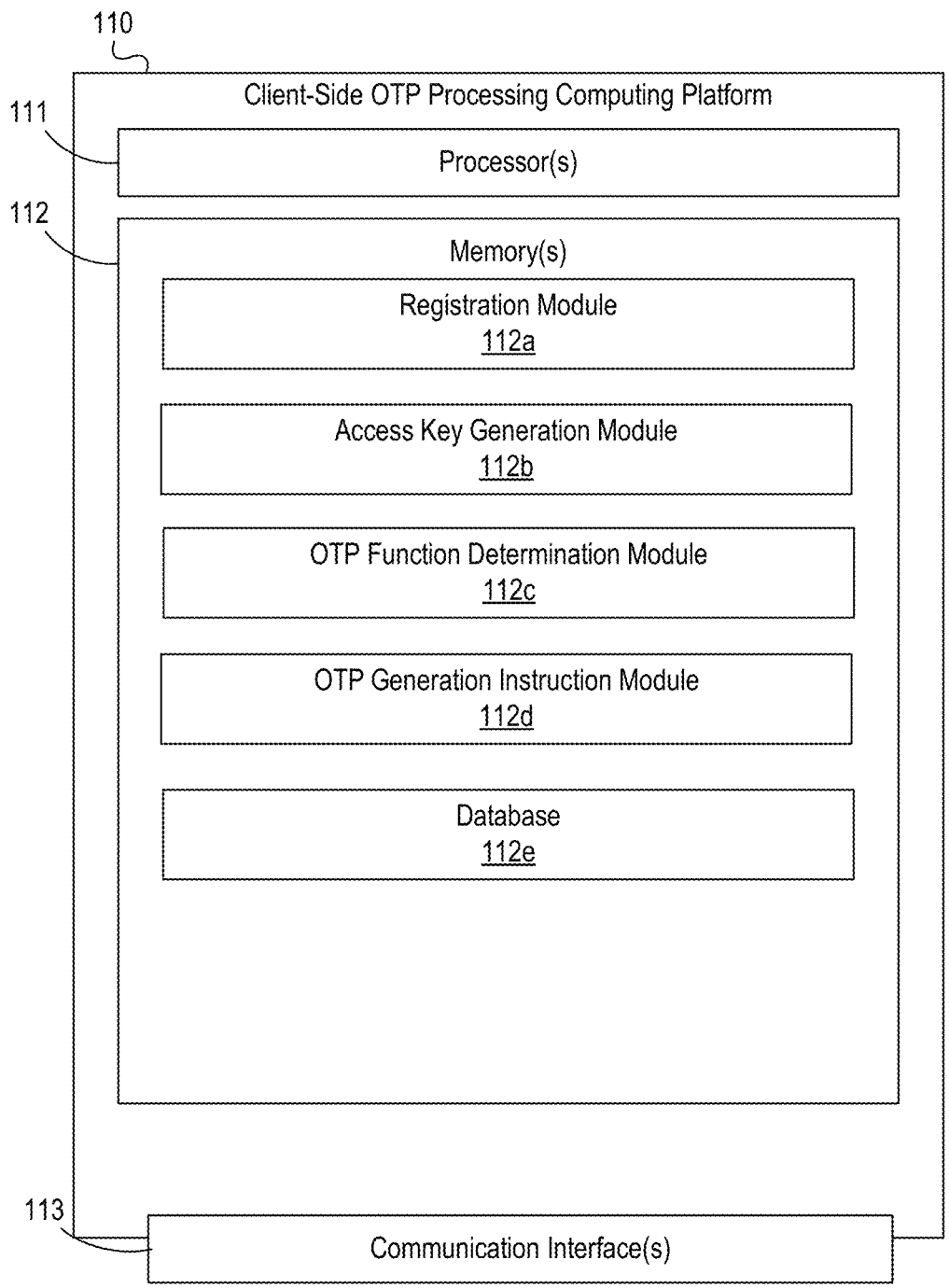

Aspects described herein may be implemented using one or more computing devices operating in a computing environment. For instance, FIGS. 1A-1B depict an illustrative computing environment for implementing client-side OTP functions in accordance with one or more aspects described herein. Referring to FIG. 1A, computing environment 100 may include one or more computing devices and/or other computing systems. For example, computing environment 100 may include client-side OTP processing computing platform 110, internal entity computing system 120, internal entity computing device 140, external entity computing system 150, and/or user computing device 170. Although one internal entity computing system 120, one internal entity computing device 140, one external entity computing system 150 and one user computing device 170, are shown, any number of systems or devices may be used without departing from the invention.

Client-side OTP processing computing platform 110 may be configured to perform intelligent, dynamic, and efficient client-side OTP functions. In some examples, client-side OTP processing computing platform may receive a request from a merchant to register with the client-side OTP processing computing platform 110. In response, client-side OTP processing computing platform 110 may generate a unique, encrypted access key specific to the merchant and may send the access key specific to the merchant to the merchant (e.g., external entity computing system 150).

Further, a user may register one or more user computing devices, such a user computing device 170, with the client-side OTP processing computing platform 110. For instance, a user may provide a unique identifier associated with one or more user computing devices. In some examples, the registered user computing devices may have an enterprise application downloaded to and/or executing on the user computing device 170. For instance, a financial institution application (e.g., mobile banking application, online banking application, or the like) may be downloaded to and/or executing on the user computing device 170.

In some examples, a user may initiate a transaction by inputting a request to process a transaction into a merchant application executing on the user computing device. The client-side OTP processing computing platform 110 may receive the request to process the transaction and may confirm or receive an indication that the enterprise application is executing (e.g., in a background) of the user computing device. If so, client-side OTP functions may be enabled. In some examples, the request to process the transaction may include transaction details, credit card or payment details, and the like.

The client-side OTP processing computing platform 110 may then cause, in response to the request to process the transaction, the user computing device (e.g., via the enterprise application) to generate a client-side OTP.

In some examples, the transaction details, credit card or payment details, and the like, may be bundled with the client-side OTP generated by the user computing device, user identifying data and/or user computing device identifying data. This data may be transmitted to an enterprise verification and processing computing system, such as internal entity computing system 120.

In some examples, client-side OTP processing computing platform 110 may be part of or a same device as user computing device 170. Additionally or alternatively, client-side OTP processing computing platform 110 may be a device separate from user computing device 170 but connected to or in communication with user computing device 170.

Internal entity computing system 120 may receive the data and verify the data. For instance, the internal entity computing system 120 may verify that the client-side OTP was generated by a registered user computing device, may verify user and/or user device data, may confirm transaction details, and the like. Based on this analysis, the internal entity computing system 120 may transmit an authorization output to the client-side OTP processing computing platform 110 and/or external entity computing system 150 and the transaction may be processed.

Internal entity computing system 120 may be or include one or more computing systems, devices, or the like (e.g., servers, server blade, and the like) including one or more computer components (e.g., processor, memory and the like), that may host or execute one or more applications of an enterprise organization. For instance, internal entity computing system 120 may host or execute applications associated with transaction processing, account updating, transaction validation and authorization, or the like. Internal entity computing system 120 may communicate with client-side OTP processing computing platform 110 to retrieve data for comparison, in some examples.

Internal entity computing device 140 may be or include one or more computing devices (e.g., laptops, desktops, mobile computing devices, and the like) and may be operated by one or more employees of the enterprise organization to control aspects of client-side OTP processing computing platform 110, monitor transaction processing associated with internal entity computing system 120, and the like.

External entity computing system 150 may be or include one or more computing devices (e.g., servers, server blades, or the like) including one or more computing components (e.g., memory, processor, and the like) associated with an entity outside of or external to the enterprise organization, such as a merchant. For instance, external entity computing system 150 may be associated with one or more merchants and may host merchant applications, store merchant data (e.g., unique merchant access key), execute calls for transaction processing, and the like.

User computing device 170 may be or include one or more user computing devices (e.g., smart phones, wearable devices, laptops, desktops, tablets, or the like) that may be used (e.g., by an employee of the enterprise organization, by a customer of the enterprise organization, or the like) to display one or more user interfaces associated with applications executing on the devices. In some examples, user computing device 170 may execute the enterprise organization application generating the client-side OTP for use in transaction authorization, may execute one or more merchant applications, and the like.

As mentioned above, computing environment 100 also may include one or more networks, which may interconnect one or more of client-side OTP processing computing platform 110, internal entity computing system 120, internal entity computing device 140, external entity computing system 150, and/or user computing device 170. For example, computing environment 100 may include network 190. Network 190 may include one or more sub-networks (e.g., Local Area Networks (LANs), Wide Area Networks (WANs), or the like). Network 190 may interconnect one or more computing devices. For example, client-side OTP processing computing platform 110, internal entity computing system 120, internal entity computing device 140, external entity computing system 150, and/or user computing device 170, may be interconnected via network 190 and may communicate or connect via network 190.

Referring to FIG. 1B, client-side OTP processing computing platform 110 may include one or more processors 111, memory 112, and communication interface 113. A data bus may interconnect processor(s) 111, memory 112, and communication interface 113. Communication interface 113 may be a network interface configured to support communication between client-side OTP processing computing platform 110 and one or more networks (e.g., private network 190, or the like). Memory 112 may include one or more program modules having instructions that when executed by processor(s) 111 cause client-side OTP processing computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of client-side OTP processing computing platform 110 and/or by different computing devices that may form and/or otherwise make up client-side OTP processing computing platform 110.

For example, memory 112 may have, store and/or include registration module 112a. Registration module 112a may have or includes instructions that may cause or enable client-side OTP processing computing platform 110 to receive requests for registration from one or more users, external entities (e.g., merchants), and the like. In some examples, registration module 112a may receive registration data from users (e.g., user identifying data, device identifying data, and the like) and may encrypt the data. In some arrangements, the encrypted data may be transmitted to the registered user device for use in authenticating the user and/or authorizing a transaction.

Registration module 112a may store user and/or external entity registration data in, for instance, database 112e.

Client-side OTP processing computing platform 110 may further have, store and/or include unique access key generation module 112b. Unique access key generation module 112b may store instructions and/or data that may cause or enable the client-side OTP processing computing platform 110 to generate, on response to an external entity request for registration, a unique access key that is unique to the external entity. In some examples, access key generation module 112b may transmit the generated access key to external entity computing system 150 and/or to user computing device 170 for storage.

Client-side OTP processing computing platform 110 may further have, store and/or include OTP function determination module 112c. OTP function determination module 112c may store instructions and/or data that may cause or enable the client-side OTP processing computing platform 110 to evaluate data received in a request to process a transaction (e.g., transaction details, external entity data, active application data from a user computing device, and the like) and determine whether one or more criteria are met to enable client-side OTP functions. For instance, OTP function determination module 112c may evaluate an external entity identifier to determine whether than application associated with that external entity was active on the user computing device.

Client-side OTP processing computing platform 110 may further have, store and/or include OTP generation instruction module 112d. OTP generation instruction module may store instructions and/or data that may cause or enable the client-side OTP processing computing platform 110 to, in response to determining that one or more criteria for client-side OTP processing are met, generate an instruction that, when transmitted to the user computing device, may cause the user computing device to generate a client-side OTP. This client-side OTP may then be used to authenticate the user and authorize the requested transaction.

FIGS. 2A-2H depict one example illustrative event sequence for implementing client-side OTP processing functions in accordance with one or more aspects described herein. The events shown in the illustrative event sequence are merely one example sequence and additional events may be added, or events may be omitted, without departing from the invention. Further, one or more processes discussed with respect to FIGS. 2A-2H may be performed in real-time or near real-time.

Figure 2A:
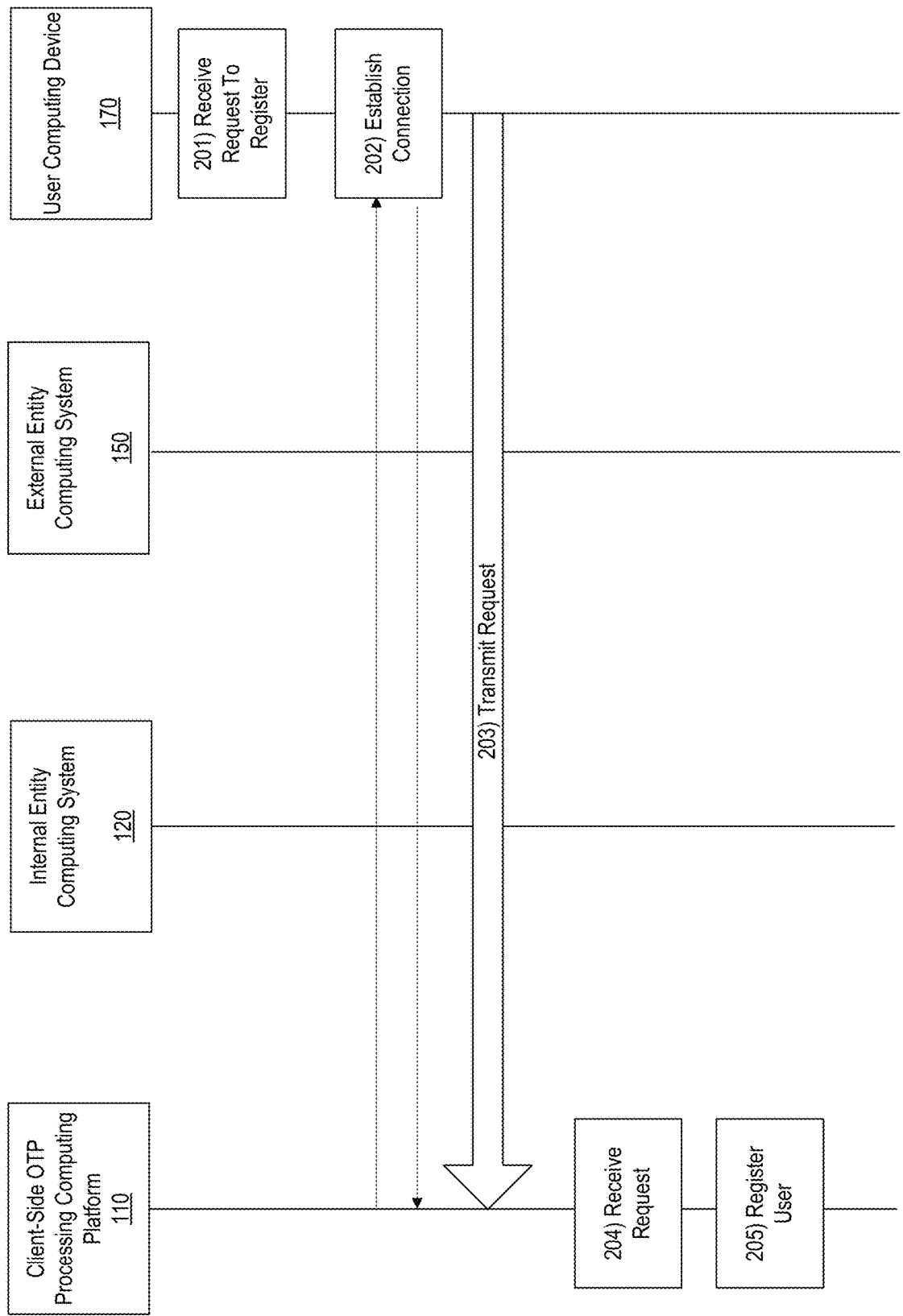
FIGS. 2A-2H depict an illustrative event sequence for implementing client-side OTP processing functions in accordance with one or more aspects described herein.

With reference to FIG. 2A, at step 201, user computing device 170 may receive a request to register with a client-side OTP processing system. In some examples, user input may be received via a touchscreen, keypad or the like, of the user computing device 170 and may include the request to register. In some examples, the request to register may be made via an enterprise organization application downloaded to and executing on user computing device 170, such as a mobile banking application.

At step 202, user computing device 170 may connect to client-side OTP processing computing platform 110. For instance, a first wireless connection may be established between user computing device 170 and client-side OTP processing computing platform 110. Upon establishing the first wireless connection, a communication session may be initiated between user computing device 170 and client-side OTP processing computing platform 110. In some examples, user computing device 170 may determine that a connection already exists. If so, an additional connection might not be established.

At step 203, the user computing device 170 may send or transmit the request for registration to the client-side OTP processing computing platform 110. For instance, the request for registration may be transmitted during the communication session initiated upon establishing the first wireless connection. In some examples, the request for registration may include user identifying data (e.g., name, unique identifier, or the like), user computing device 170 identifying data (e.g., unique identifier), and the like.

At step 204, client-side OTP processing computing platform 110 may receive the registration request, user identifier, device identifier, and the like.

At step 205, the user may be registered with client-side OTP functions. For instance, the user identifying data may be verified and the user may be authorized to execute client-side OTP functions.

Figure 2B:
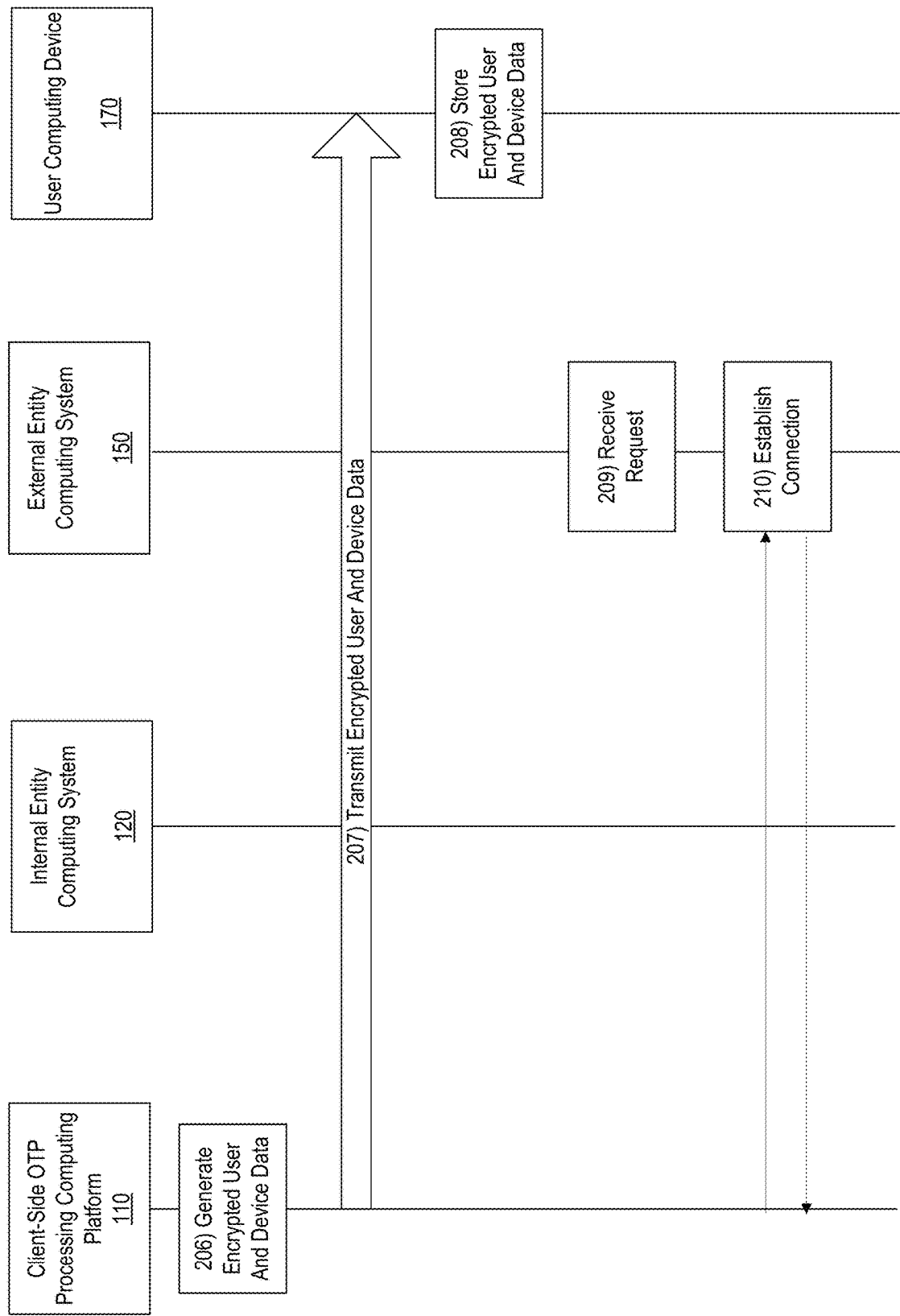

With reference to FIG. 2B, at step 206, the verified user data and user computing device 170 data may be encrypted by the client-side OTP processing computing platform 110. For instance, received user identifying data that was verified during a registration process and user computing device 170 data may be encrypted.

At step 207, the client-side OTP processing computing platform 110 may transmit or send the encrypted user and user computing device 170 data to the user computing device 170. At step 208, the encrypted data may be received by the user computing device 170 and stored by the user computing device 170.

At step 209, an external entity computing device 150, such as a merchant computing device, may receive a request for registration. For instance, a user associated with the external entity (e.g., external to enterprise organization implementing client-side OTP processing computing platform 110) may input, into the external entity computing system 150, a request to register for client-side OTP processing functions.

At step 210, external entity computing system 150 may connect to client-side OTP processing computing platform 110. For instance, a second wireless connection may be established between external entity computing system 150 and client-side OTP processing computing platform 110. Upon establishing the second wireless connection, a communication session may be initiated between external entity computing system 150 and client-side OTP processing computing platform 110. In some examples, external entity computing system 150 may determine that a connection already exists. If so, an additional connection might not be established.

Figure 2C:
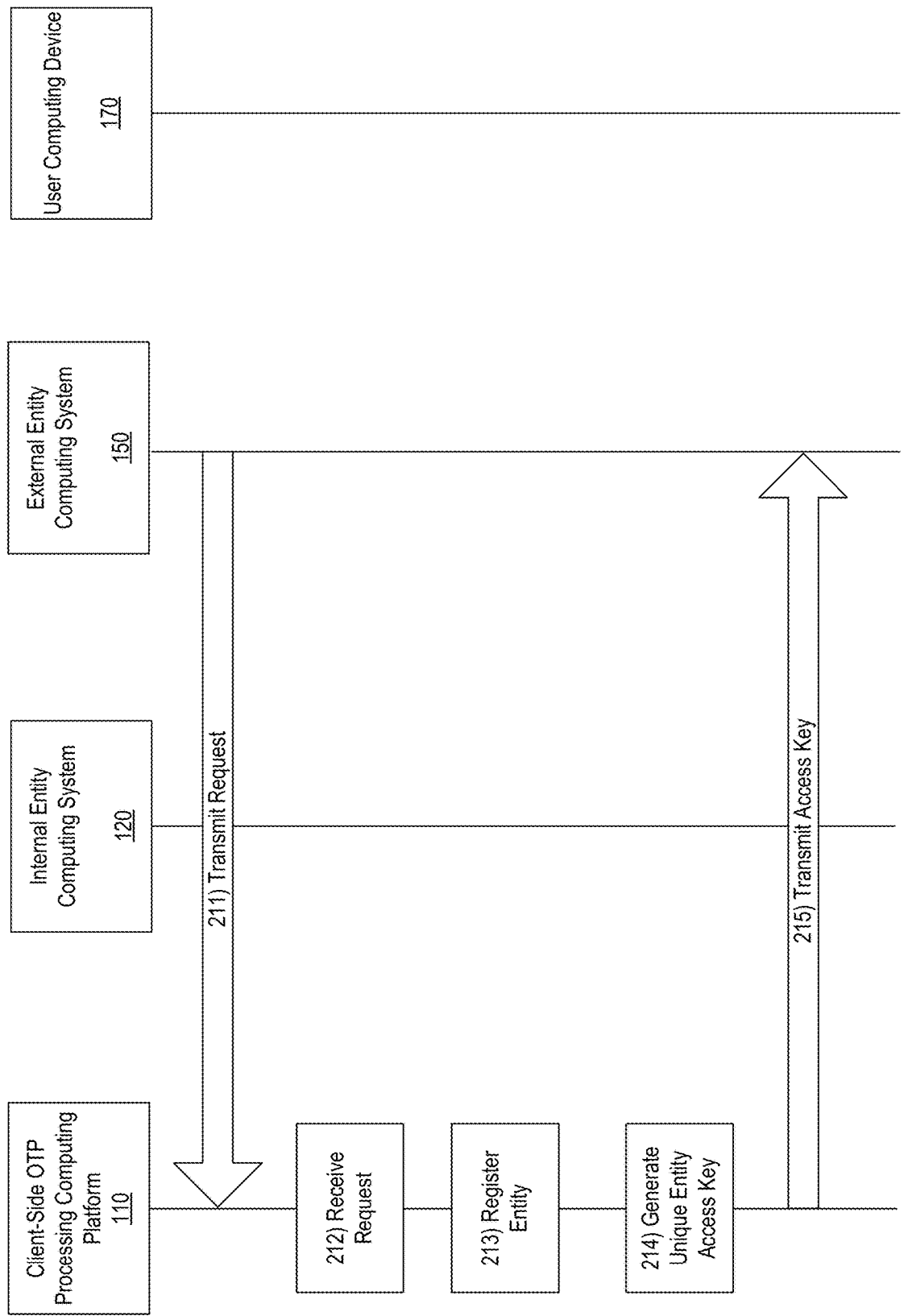

With reference to FIG. 2C, at step 211, external entity computing system 150 may transmit or send the request for registration to the client-side OTP processing computing platform 110. For instance, external entity computing system 150 may transmit the request during the communication session initiated upon establishing the second wireless connection.

At step 212, client-side OTP processing computing platform 110 may receive the request for registration and may validate the external entity. At step 213, the external entity associated with external entity computing system 150 may be registered by the client-side OTP processing computing platform 110.

At step 214, in response to registering the external entity, a unique access code associated with the external entity may be generated. For instance, if a plurality of external entities (e.g., merchants, service providers, or the like) register with the client-side OTP processing computing platform 110, a unique access key may be generated for each external entity.

At step 215, client-side OTP processing computing platform 110 may transmit the generated unique access key to the external entity computing system 150.

Figure 2D:
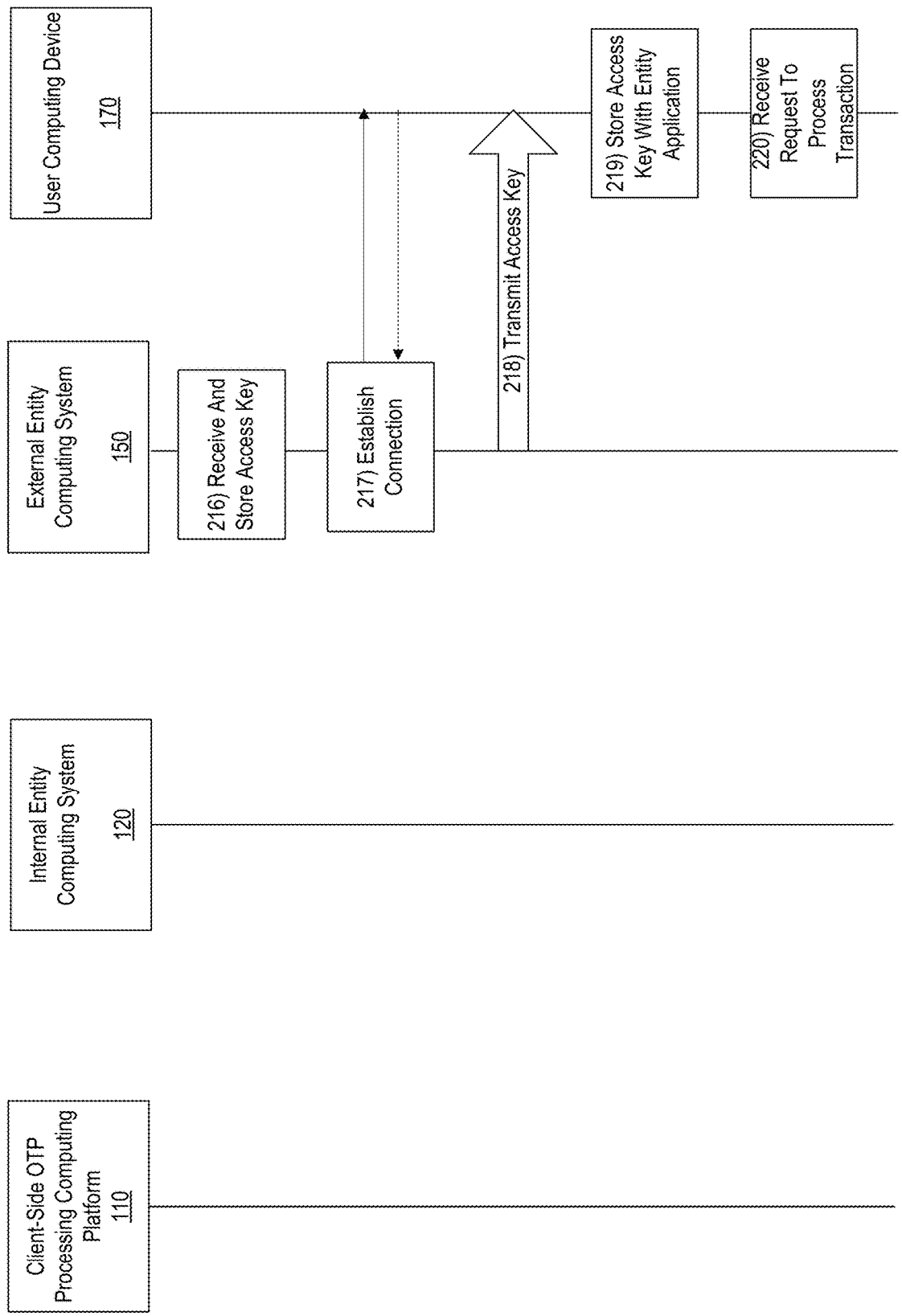

With reference to FIG. 2D, at step 216, external entity computing system 150 may receive and store the unique access key.

At step 217, external entity computing system 150 may connect to user computing device 170. For instance, a third wireless connection may be established between external entity computing system 150 and client-user computing device 170. Upon establishing the third wireless connection, a communication session may be initiated between external entity computing system 150 and user computing device 170. In some examples, external entity computing system 150 may determine that a connection already exists. If so, an additional connection might not be established.

At step 218, external entity computing system 150 may transmit or send the unique access key associated with the external entity to user computing device 170. For instance, user computing device 170 may have or include an application associated with the external entity (e.g., a mobile application associated with a merchant) and may use that application to execute transactions (e.g., make purchases, modify services, or the like). Accordingly, the external entity computing system 150 may transmit or send the unique access code to the user computing device 170 for use in processing transactions.

At step 219, user computing device 170 may receive the unique access key associated with the merchant and may store the access key via a merchant application on the user computing device 170. For instance, the user computing device 170 may have or execute one or more merchant applications and the user computing device 170 may store unique access keys for each merchant associated with the one or more merchant applications.

At step 220, user computing device 170 may receive a request to process a transaction. In some examples, the request to process the transaction may be made while the enterprise organization application is executing in a background of the user computing device 170 and may be made via an external entity application executing (e.g., running in a foreground) of the user computing device 170. For instance, a user may wish to conduct a transaction with a merchant, may launch the merchant application on the user computing device 170 and may input credit card details (e.g., account number, expiration data, CVV, name, and the like) to initiate or request transaction processing. FIG. 4 illustrates one example user interface 400 that may be used to request a transaction via an external entity application executing on the user computing device 170. User interface 400 includes fields to input payment information (e.g., credit card number, debit card number, or the like), expiration date information, and the like. Additional data may be requested without departing from the invention.

Figure 2E:
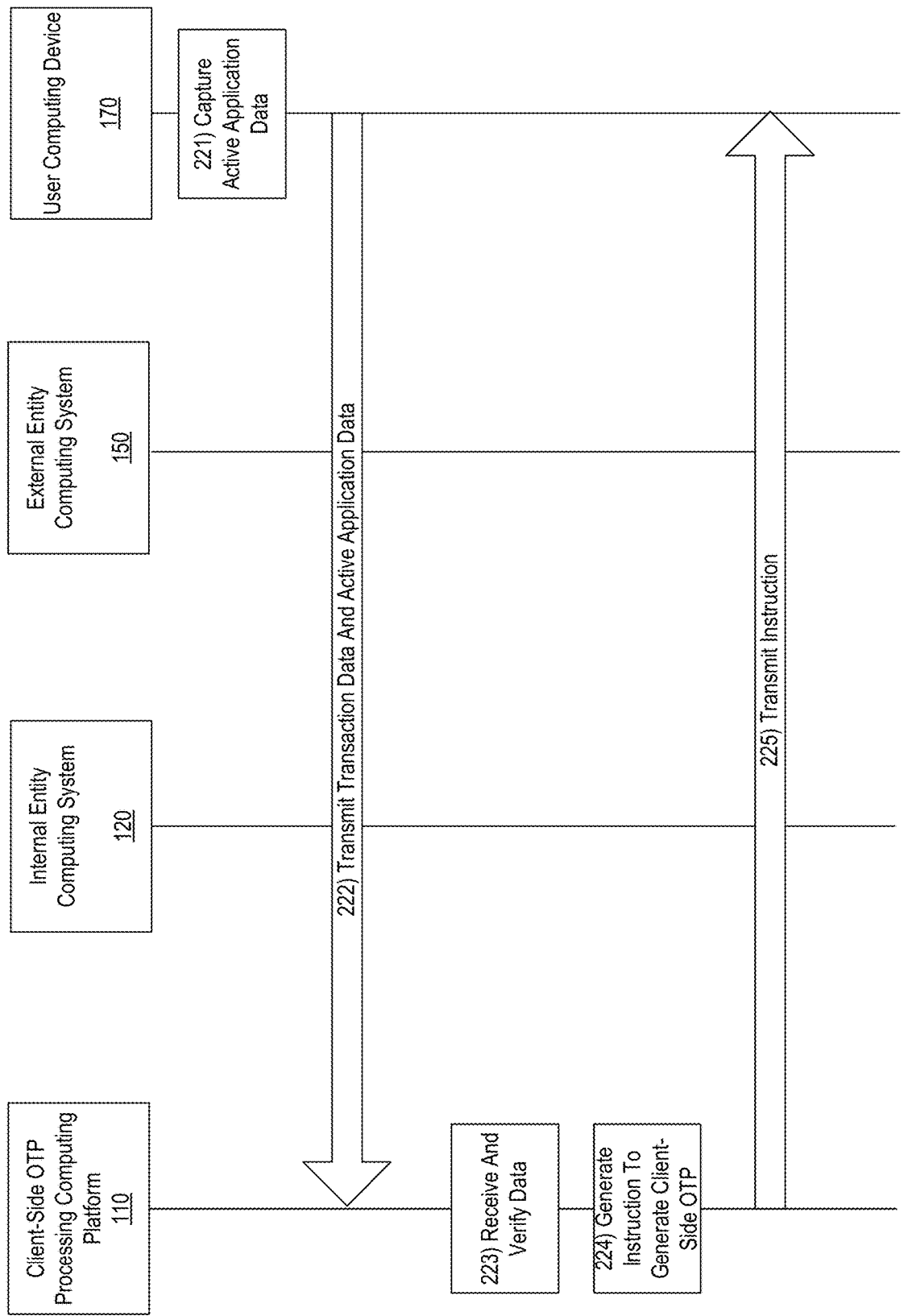

With reference to FIG. 2E, at step 221, user computing device 170 may capture active application data. For instance, during the registration process, the user may provide permission to share active application data associated with the registered user device (e.g., user computing device 170). Accordingly, the user computing device 170 may capture data associated with whether the enterprise organization was executing in the background, whether the application associated with the external entity (e.g., the entity with which the transaction is being processed) is active and running (e.g., in the foreground), or the like. This data may be used to determine whether client-side OTP functions should be enabled. For instance, in some examples, client-side OTP functions may be used when the enterprise organization application is running in the background of a registered user device and the external entity application is active (e.g., the application through which the user requested the transaction).

At step 222, user computing device 170 may transmit or send transaction data (e.g. credit card data, and the like), captured active application data, and the like, to the client-side OTP processing computing platform 110.

At step 223, client-side OTP processing computing platform 110 may receive and verify the transaction data, captured active application data, and the like. For instance, the client-side OTP may recognize that the transaction is requested and may extract an external entity with which the transaction was requested. In some examples, the client-side OTP processing computing platform may confirm that the application associated with that external entity was or is active on the user computing device 170 and/or may confirm that the enterprise organization application was executing in the background of user computing device 170.

Based on verifying the received transaction and active application data, at step 224, an instruction to generate a client-side OTP may be generated. For instance, client-side OTP processing computing platform 110 may generate an instruction or command to generate a client-side OTP.

At step 225, client-side OTP processing computing platform 110 may transmit or send the instruction to generate the client-side OTP to the user computing device 170.

Figure 2F:
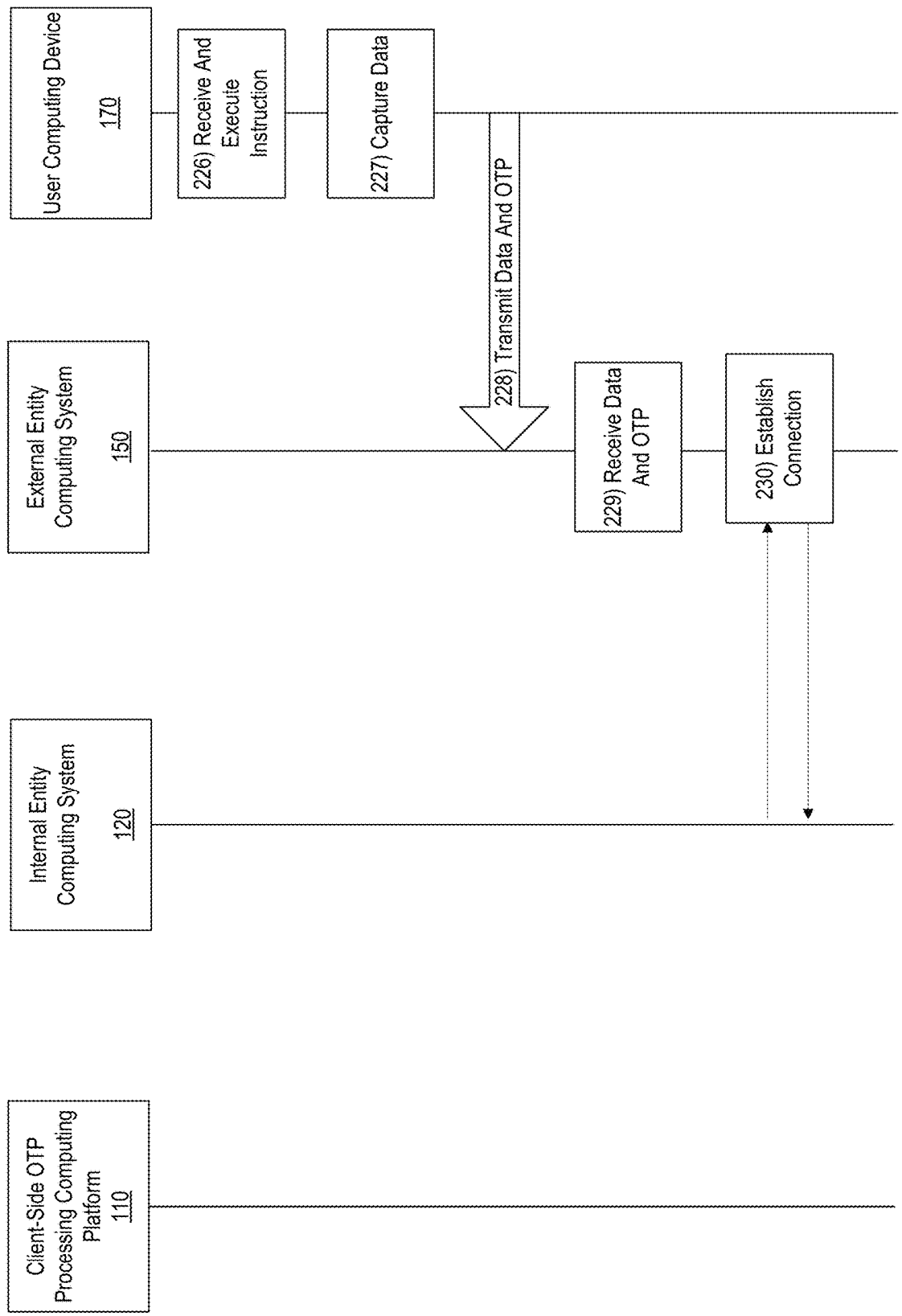

With reference to FIG. 2F, at step 226, user computing device 170 may receive and execute the instruction to generate the client-side OTP. For instance, user computing device 170 (e.g., via the enterprise organization application) may generate a one-time passcode for use in authenticating the user and authorizing the transaction. The client-side OTP may be a randomly generated alphanumeric string of characters, may include a portion that identifies one or more parties of the transaction or the like. The client-side OTP may be any number of characters with longer strings of characters providing increased security. In some examples, the client-side OTP may include or be generated based on external entity (e.g., merchant) identifying information, user identifying information (e.g., unique identifier), user computing device 170 identifying information, and the like. In some examples, the client-side OTP may include or be generated based on the encrypted user and user computing device 170 data stored on the user computing device 170.

At step 227, user computing device 170 may capture data associated with processing the transaction. For instance, the transactions details (e.g., amount, type, or the like), user payment data (e.g., credit card number, expiration date and the like), client-side OTP, and the like, may be captured.

At step 228, the captured data (e.g., payment data, client-side OTP, and the like) may be transmitted by the user computing device to the external entity computing system 150 for transaction processing.

At step 229, the external entity computing system 150 may receive the captured data.

At step 230, external entity computing system 150 may connect to internal entity computing device 120. For instance, a fourth wireless connection may be established between external entity computing system 150 and internal entity computing system 120. Upon establishing the fourth wireless connection, a communication session may be initiated between external entity computing system 150 and internal entity computing system 120. In some examples, external entity computing system 150 may determine that a connection already exists. If so, an additional connection might not be established.

Figure 2G:
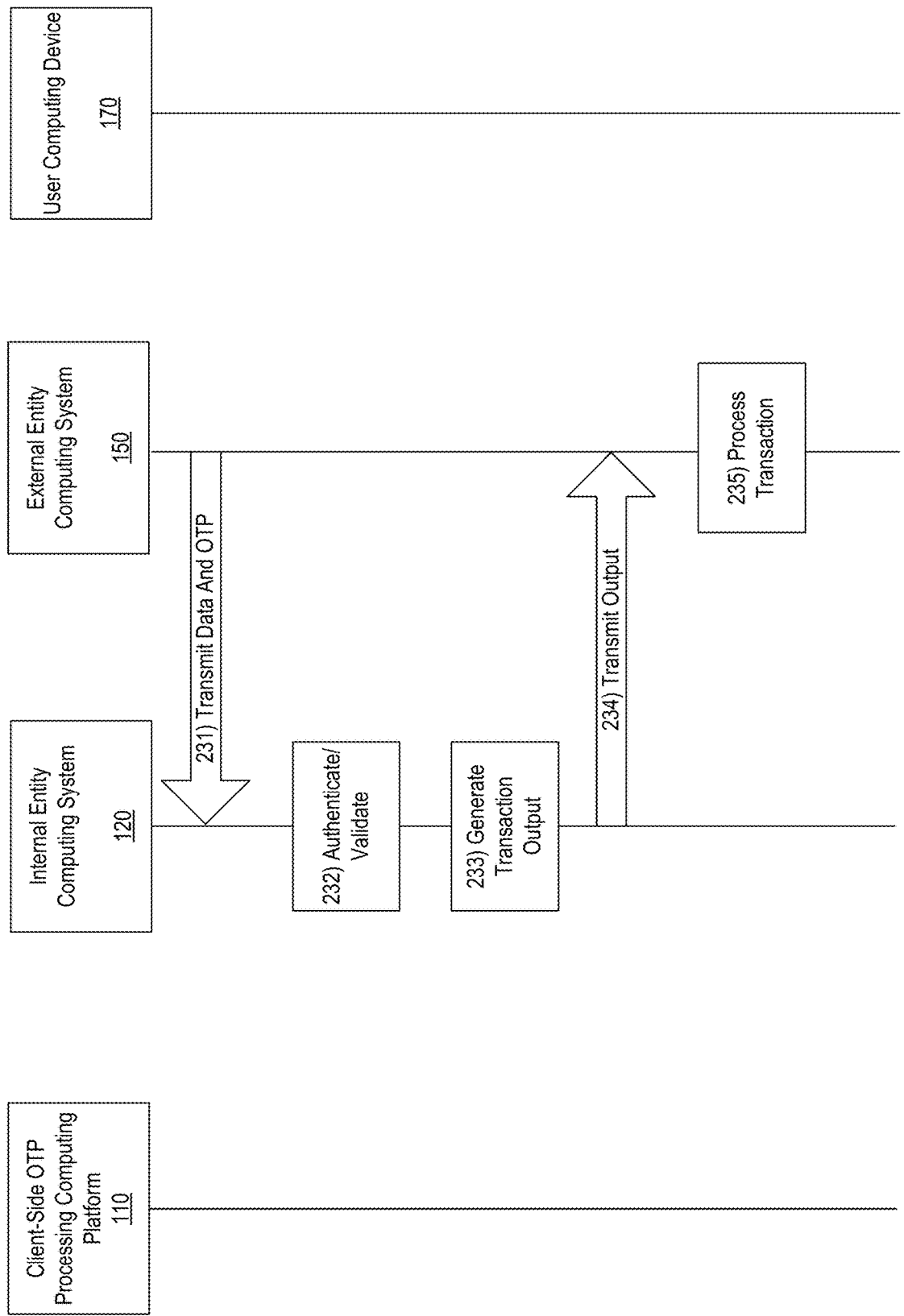

With reference to FIG. 2G, at step 231, the captured data and OTP may be transmitted by the external entity computing system 150 to the internal entity computing system for authentication and/or validation. For instance, the captured data and client-side OTP generated by the user computing device 170 may be transmitted to the internal entity computing system 120.

At step 232, the internal entity computing system 120 may receive the captured data and client-side OTP and may validate the data and authenticate the user in order to process the transaction. For instance, the internal entity computing system 120 may confirm that the client-side OTP was generated by the registered user device for instance, by evaluating the user and/or user computing device 170 data associated with the OTP (e.g., the encrypted data may be decrypted by internal entity computing system 120 to determine whether the client-side OTP was generated by the registered device of the user).

At step 233, a transaction output may be generated by the internal entity computing system 120. For instance, if the client-side OTP is validated, the user may be authenticated and the transaction may be authorized for processing. If not, the system may request additional authentication data, may transmit a conventional OTP that the user may input into the user device, or the like.

At step 234, internal entity computing system 120 may transmit or send the transaction output to the external entity computing system 150.

At step 235, the transaction output may be received by the external entity computing system 150 and, if authorized, the transaction may be processed.

Figure 2H:
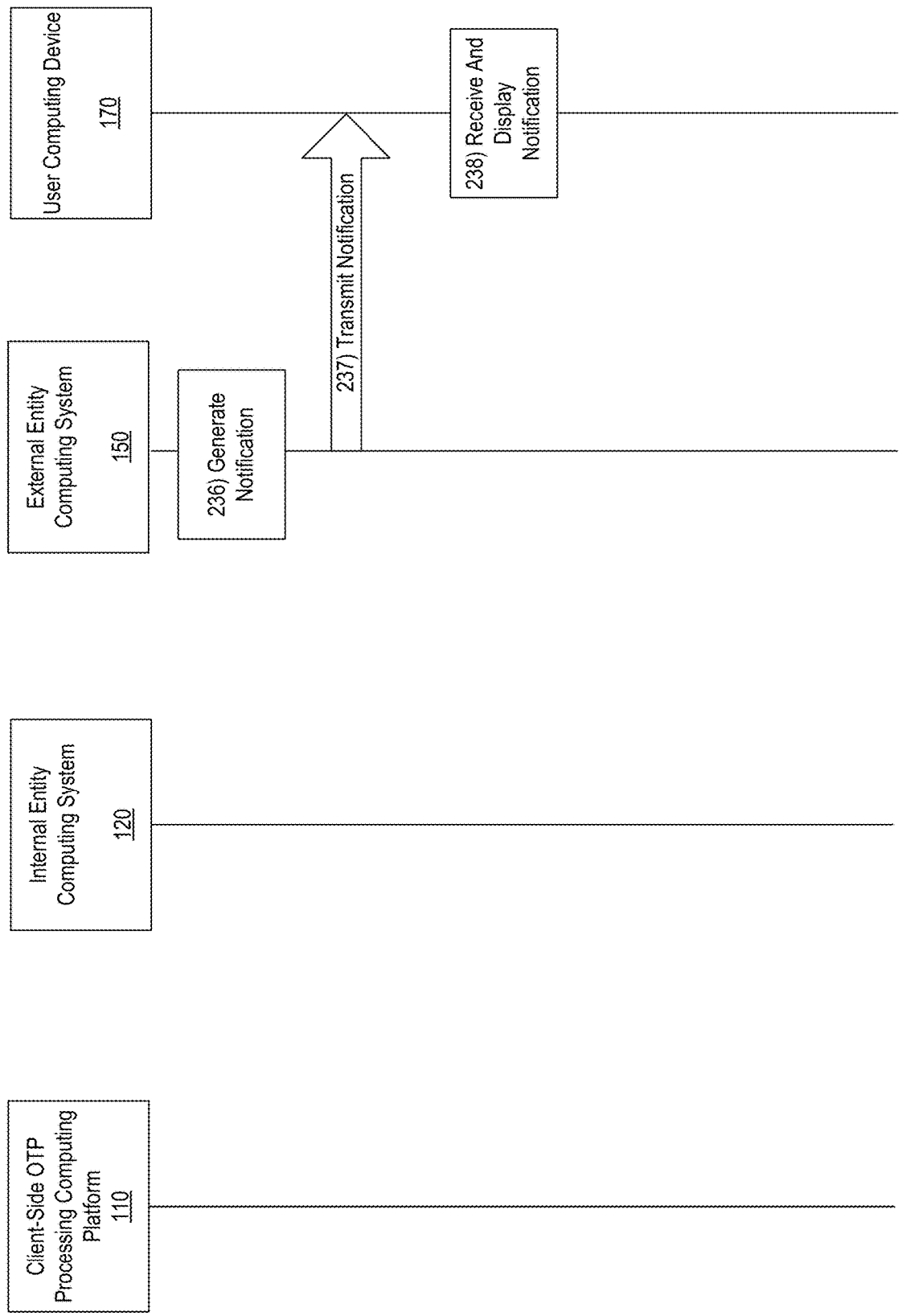

With reference to FIG. 2H, at step 236, external entity computing system 150 may generate a notification indicating that the transaction was processed. For instance, FIG. 5 illustrates one example user interface 500 indicating successful transaction processing.

At step 237, the generated notification may be transmitted by the external entity computing system 150 to the user computing device 170. In some examples, transmitting the notification may cause the notification to be displayed by a display of the user computing device 170. Accordingly, at step 238, user computing device 170 may receive the notification and may display the notification.

Figure 3:
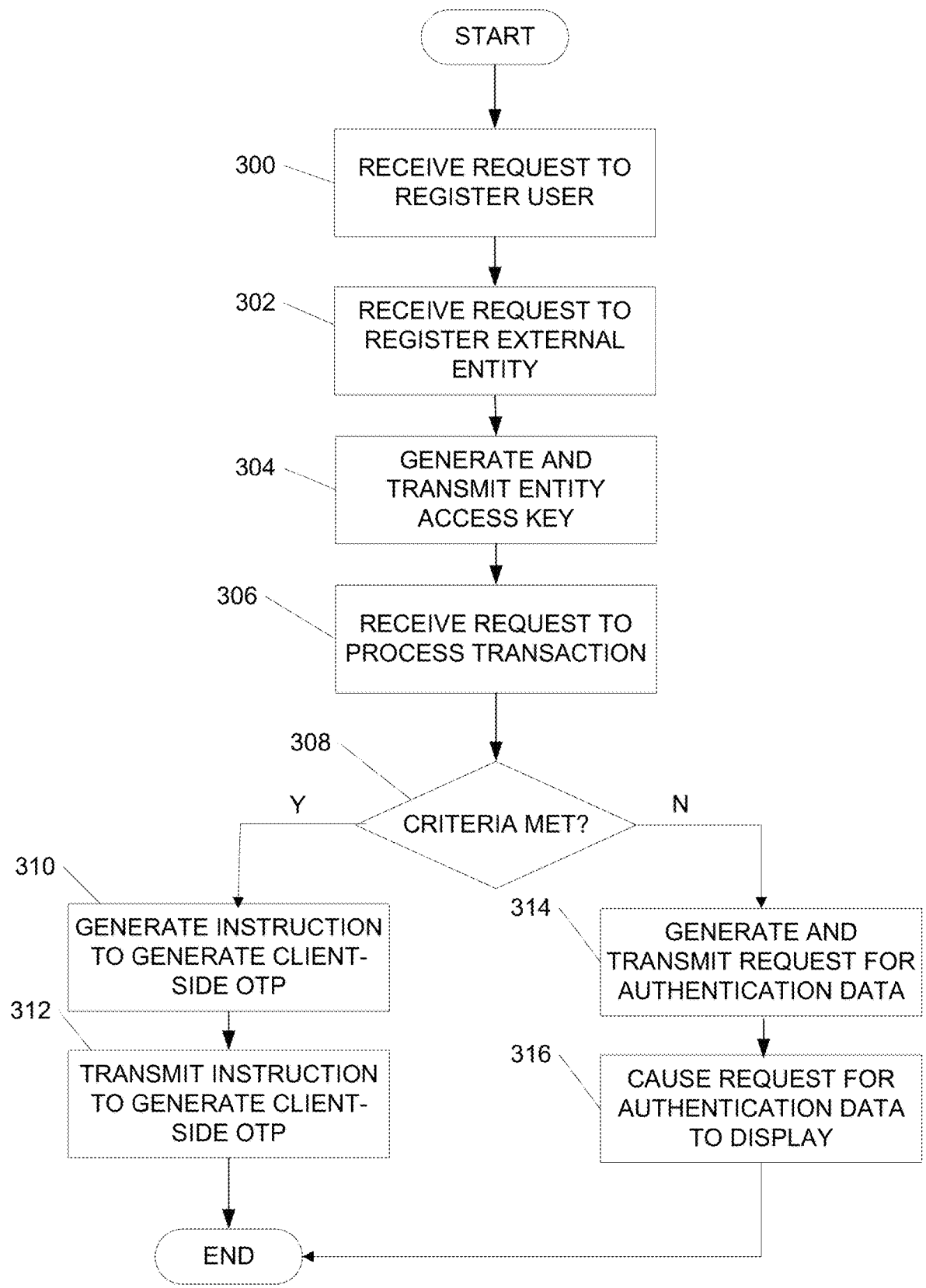
FIG. 3 illustrates an illustrative method for implementing client-side OTP processing functions according to one or more aspects described herein.

FIG. 3 is a flow chart illustrating one example method of implementing client-side OTP processing functions in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, a request to register a user may be received by client-side OTP processing computing platform 110. For instance, a user may request, via an enterprise organization application executing on a user computing device 170, to register for client-side OTP processing functions. The request may include user identifying information, user computing device identifying information, permission to capture active application data, and the like. In some examples, the user identifying data user computing device identifying data may be encrypted and the encrypted data sent to the user computing device to be stored for use in generating the client-side OTP.

At step 302, a request to register an external entity may be received by client-side OTP processing computing platform 110. For instance, an external entity may request, via an external entity computing system 150, to register for client-side OTP processing functionality.

In response to the request to register the entity, a unique access code may be generated for the external entity and transmitted to the external entity computing system 150 at step 304. In some examples, generating and transmitting the access key may cause the external entity computing system 150 to transmit or send the access key to the user computing device 170 to be stored with an external entity application on the user computing device 170.

At step 306, a request to process a transaction may be received. In some examples, the request to process the transaction may be received from the user computing device 170 and via the external entity application executing on the user computing device 170. The request to process the transaction may include transaction details (e.g., amount, external entity name, and the like), user and/or user device data (e.g., encrypted data), data associated with one or more applications executing in the foreground or background of the user computing device, and the like.

At step 308, the request to process the transaction may be analyzed to determine whether one or more criteria are met by the data received. For instance, the data associated with the request to process the transaction may be analyzed to identify an application that was executing or active in the foreground when the transaction request was received (e.g., the application into which credit card data was provided, or the like). This may be compared to merchant or external entity data received in the request to confirm that the external entity with whom the transaction is being processed is the same external entity as associated with the currently active application on the user computing device 170. If so, client-side OTP functions may be enabled. Additionally or alternatively, active application data may be analyzed to determine whether an enterprise organization application was executing in the background of the user computing device 170. If so, client-side OTP functions may be enabled. Various other aspects of the data may be analyzed to determine whether one or more criteria are met.

If, at step 308, the one or more criteria are met, at step 310 an instruction to generate a client-side OTP may be generated. For instance, an instruction that may cause the user computing device 170 from which the request to process the transaction was received, to generate a client-side OTP for use in authenticating the user and authorizing the transaction may be generated.

At step 312, the instruction may be transmitted or sent to the user computing device 170 and executed by the user computing device 170. Accordingly, the user computing device 170 may generate the client-side OTP (e.g., via enterprise organization application or other application on the user computing device 170) which may then be transmitted to the merchant (e.g., external entity computing system 150) and, ultimately, to a payment processing service or device for authentication and authorization. In some examples, the client-side OTP may be active for a particular transaction, for a particular time period or the like. Accordingly, if a transaction is not processed within a predetermined time period, in some examples, the client-side OTP may expire or may be deactivated or invalidated.

If, at step 308, the one or more criteria are not met (e.g., the external entity application is not the application running in the foreground, the enterprise organization application is not running in the background, or the like), client-side OTP functions might not be enabled and, instead, a request for additional authentication data may be generated and transmitted to, for instance, user computing device 170 at step 314. Transmitting the request for additional authentication data may then cause the request for additional authentication data to be displayed on a display of user computing device 170 at step 316.

Accordingly, arrangements provided herein provide efficient and streamlined multi-level authentication while minimizing user interaction and application programming interface (API) calls to a server. As discussed, by generating an OTP on a user computing device (e.g., locally), all data for use in all levels of authentication may be transmitted for verification in one call. Accordingly, speed of transaction processing and efficiency may be improved, while maintaining the security associated with use of one-time passcodes.

For instance, in conventional arrangements, a first API call must be made from the merchant to the transaction processing system to generate and transmit an OTP to the user device. The user must then input the OTP and the merchant will then make a second API call to the transaction processing system with the OTP input by this user. This is time consuming and may be prone to error which may frustrate the user.

Accordingly, arrangements described herein maintain the security of using OTP as a second level of authentication (e.g., with credit card number, expiration data, CVV, and the like being a first level of authentication) but remove the need for a user to input the OTP. By generating an OTP at the registered user device, a secure code may be used to authenticate the user and authorize the transaction without multiple calls to the transaction processing system, without additional user input, and the like. Instead, the user computing device may generate the client-side OTP locally, which may then be transmitted in a single call for transaction processing.

As discussed herein, client-side OTP processing may be used for registered users, user devices, external entities, and the like. Accordingly, client-side OTP functionality may be enabled upon one or more criteria being met. For instance, if an enterprise organization application is executing in the background of user computing device and the external entity matches the application executing in the foreground, client-side OTP functions may be enabled. However, if one or more criteria are not met, additional authentication may be requested. For instance, conventional arrangements in which an OTP is sent to the user device and input by the user may be requested. Additionally or alternatively, a notification or prompt may be displayed on the user computing device asking whether the user would like to enable client-side OTP functions.

Figure 6:
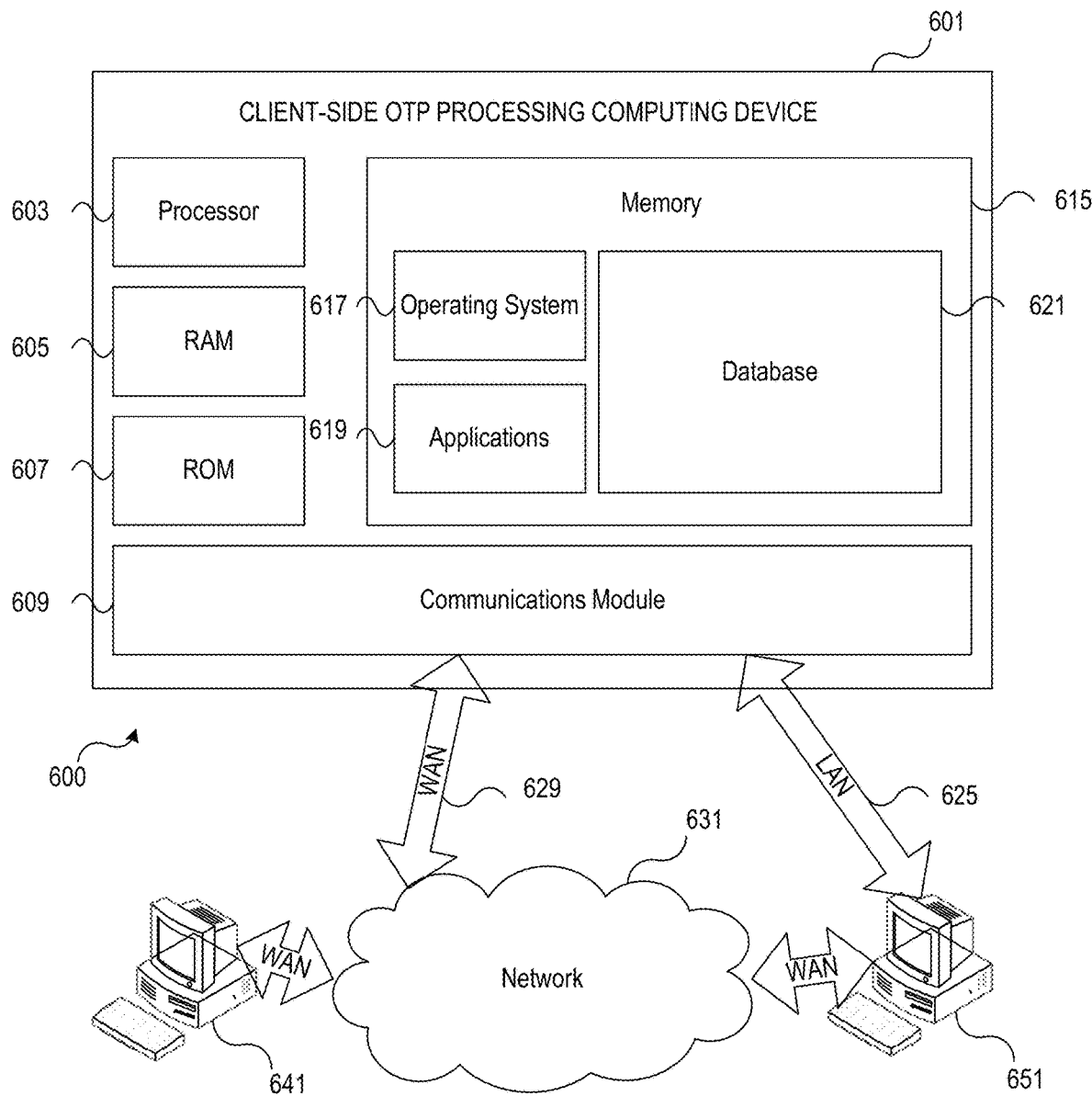
FIG. 6 illustrates one example environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include client-side OTP processing computing device 601 having processor 603 for controlling overall operation of client-side OTP processing computing device 601 and its associated components, including Random Access Memory (RAM) 605, Read-Only Memory (ROM) 607, communications module 609, and memory 615. Client-side OTP processing computing device 601 may include a variety of computer readable media. Computer readable media may be any available media that may be accessed by client-side OTP processing computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by client-side OTP processing computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on client-side OTP processing computing device 601. Such a processor may execute computer-executable instructions stored on a computer-readable medium.

Software may be stored within memory 615 and/or storage to provide instructions to processor 603 for enabling client-side OTP processing computing device 601 to perform various functions as discussed herein. For example, memory 615 may store software used by client-side OTP processing computing device 601, such as operating system 617, application programs 619, and associated database 621. Also, some or all of the computer executable instructions for client-side OTP processing computing device 601 may be embodied in hardware or firmware. Although not shown, RAM 605 may include one or more applications representing the application data stored in RAM 605 while client-side OTP processing computing device 601 is on and corresponding software applications (e.g., software tasks) are running on client-side OTP processing computing device 601.

Communications module 609 may include a microphone, keypad, touch screen, and/or stylus through which a user of client-side OTP processing computing device 601 may provide input, and may also include one or more of a speaker for providing audio output and a video display device for providing textual, audiovisual and/or graphical output. Computing system environment 600 may also include optical scanners (not shown).

Client-side OTP processing computing device 601 may operate in a networked environment supporting connections to one or more remote computing devices, such as computing devices 641 and 651. Computing devices 641 and 651 may be personal computing devices or servers that include any or all of the elements described above relative to client-side OTP processing computing device 601.

The network connections depicted in FIG. 6 may include Local Area Network (LAN) 625 and Wide Area Network (WAN) 629, as well as other networks. When used in a LAN networking environment, client-side OTP processing computing device 601 may be connected to LAN 625 through a network interface or adapter in communications module 609. When used in a WAN networking environment, client-side OTP processing computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
    at least one processor;
    a communication interface communicatively coupled to the at least one processor; and
    a memory storing computer-readable instructions that, when executed by the at least one processor, cause the computing platform to:
        receive, from a user computing device, a request to register a user and the user computing device for client-side one-time passcode (OTP) functionality, the request to register for client-side OTP functionality being input via an enterprise organization application on the user computing device;
        receive, from an external entity computing device, a request to register an external entity for client-side OTP functionality;
        generate, based on the request to register the external entity for the client-side OTP functionality, a unique access key, the unique access key being unique to the external entity;
        transmit, to the external entity computing device, the unique access key, wherein transmitting the unique access key causes the external entity computing device to transmit the unique access key to the user computing device and store the unique access key via an external entity application on the user computing device;
        receive, from the user computing device and via the external entity application on the user computing device, a request to process a transaction with the external entity, the request to process the transaction including transaction details and the unique access key of the external entity;
        analyze the request to process the transaction to determine whether one or more criteria are met;
        responsive to determining that the one or more criteria are met:
            generate an instruction causing the user computing device to generate a client-side OTP associated with the requested transaction;
            transmit the instruction causing the user computing device to generate the client-side OTP to the user computing device, wherein transmitting the instruction causes the user computing device to generate the client-side OTP for use in authenticating the user for the transaction;
        responsive to determining that the one or more criteria are not met:
            generate a request for additional authentication data;
            transmit the generated request for additional authentication data to the user computing device; and
            cause the request for additional authentication data to display on a display of the user computing device.

2. The computing platform of claim 1, wherein the generated client-side OTP is transmitted to the external entity computing device to authenticate the user and authorize the transaction.

3. The computing platform of claim 1, wherein the request to process the transaction further includes active application data from the user computing device.

4. The computing platform of claim 3, wherein the active application data includes an indication of an active application executing in a foreground of the user computing device and wherein analyzing the request to process the transaction to determine whether one or more criteria are met includes determining whether the active application executing in the foreground of the user computing device is the external entity application.

5. The computing platform of claim 1, wherein the request to process the transaction further includes an indication of whether the enterprise organization application was executing in a background of the user computing device, and wherein analyzing the request to process the transaction to determine whether one or more criteria are met includes determining whether the enterprise organization application was executing in the background of the user computing device.

6. The computing platform of claim 1, wherein the generated client-side OTP includes user information, user computing device information and merchant information.

7. The computing platform of claim 1, wherein the generated client-side OTP is configured to expire when the requested transaction is not processed within a predetermined time period.

8. A method, comprising:
    receiving, by a computing device, the computing device having at least one processor, and memory, and from a user computing device, a request to register a user and the user computing device for client-side one-time passcode (OTP) functionality, the request to register for client-side OTP functionality being input via an enterprise organization application on the user computing device;
    receiving, by the at least one processor and from an external entity computing device, a request to register an external entity for client-side OTP functionality;
    generating, by the at least one processor and based on the request to register the external entity for the client-side OTP functionality, a unique access key, the unique access key being unique to the external entity;
    transmitting, by the at least one processor and to the external entity computing device, the unique access key, wherein transmitting the unique access key causes the external entity computing device to transmit the unique access key to the user computing device and store the unique access key via an external entity application on the user computing device;

receiving, by the at least one processor and from the user computing device and via the external entity application on the user computing device, a request to process a transaction with the external entity, the request to process the transaction including transaction details and the unique access key of the external entity;

analyzing, by the at least one processor, the request to process the transaction to determine whether one or more criteria are met;

when it is determined that the one or more criteria are met:
generating, by the at least one processor, an instruction causing the user computing device to generate a client-side OTP associated with the requested transaction;
transmitting, by the at least one processor, the instruction causing the user computing device to generate the client-side OTP to the user computing device, wherein transmitting the instruction causes the user computing device to generate the client-side OTP for use in authenticating the user for the transaction;

when it is determined that the one or more criteria are not met:
generating, by the at least one processor, a request for additional authentication data;
transmitting, by the at least one processor, the generated request for additional authentication data to the user computing device; and
cause the request for additional authentication data to display on a display of the user computing device.

9. The method of claim 8, wherein the generated client-side OTP is transmitted to the external entity computing device to authenticate the user and authorize the transaction.

10. The method of claim 8, wherein the request to process the transaction further includes active application data from the user computing device.

11. The method of claim 10, wherein the active application data includes an indication of an active application executing in a foreground of the user computing device and wherein analyzing the request to process the transaction to determine whether one or more criteria are met includes determining whether the active application executing in the foreground of the user computing device is the external entity application.

12. The method of claim 8, wherein the request to process the transaction further includes an indication of whether the enterprise organization application was executing in a background of the user computing device, and wherein analyzing the request to process the transaction to determine whether one or more criteria are met includes determining whether the enterprise organization application was executing in the background of the user computing device.

13. The method of claim 8, wherein the generated client-side OTP includes user information, user computing device information and merchant information.

14. The method of claim 8, wherein the generated client-side OTP is configured to expire when the requested transaction is not processed within a predetermined time period.

15. One or more non-transitory computer-readable media storing instructions that, when executed by a computing platform comprising at least one processor, memory, and a communication interface, cause the computing platform to:
receive, from a user computing device, a request to register a user and the user computing device for client-side one-time passcode (OTP) functionality, the request to register for client-side OTP functionality being input via an enterprise organization application on the user computing device;
receive, from an external entity computing device, a request to register an external entity for client-side OTP functionality;
generate, based on the request to register the external entity for the client-side OTP functionality, a unique access key, the unique access key being unique to the external entity;
transmit, to the external entity computing device, the unique access key, wherein transmitting the unique access key causes the external entity computing device to transmit the unique access key to the user computing device and store the unique access key via an external entity application on the user computing device;
receive, from the user computing device and via the external entity application on the user computing device, a request to process a transaction with the external entity, the request to process the transaction including transaction details and the unique access key of the external entity;
analyze the request to process the transaction to determine whether one or more criteria are met;
responsive to determining that the one or more criteria are met:
generate an instruction causing the user computing device to generate a client-side OTP associated with the requested transaction;
transmit the instruction causing the user computing device to generate the client-side OTP to the user computing device, wherein transmitting the instruction causes the user computing device to generate the client-side OTP for use in authenticating the user for the transaction;
responsive to determining that the one or more criteria are not met:
generate a request for additional authentication data;
transmit the generated request for additional authentication data to the user computing device; and
cause the request for additional authentication data to display on a display of the user computing device.

16. The one or more non-transitory computer-readable media of claim 15, wherein the generated client-side OTP is transmitted to the external entity computing device to authenticate the user and authorize the transaction.

17. The one or more non-transitory computer-readable media of claim 15, wherein the request to process the transaction further includes active application data from the user computing device.

18. The one or more non-transitory computer-readable media of claim 17, wherein the active application data includes an indication of an active application executing in a foreground of the user computing device and wherein analyzing the request to process the transaction to determine whether one or more criteria are met includes determining whether the active application executing in the foreground of the user computing device is the external entity application.

19. The one or more non-transitory computer-readable media of claim 15, wherein the request to process the transaction further includes an indication of whether the enterprise organization application was executing in a background of the user computing device, and wherein analyzing the request to process the transaction to determine whether one or more criteria are met includes determining whether the enterprise organization application was executing in the background of the user computing device.

20. The one or more non-transitory computer-readable media of claim 15, wherein the generated client-side OTP includes user information, user computing device information and merchant information.

21. The one or more non-transitory computer-readable media of claim 15, wherein the generated client-side OTP is configured to expire when the requested transaction is not processed within a predetermined time period.

\* \* \* \* \*